Patented Sept. 9, 1952

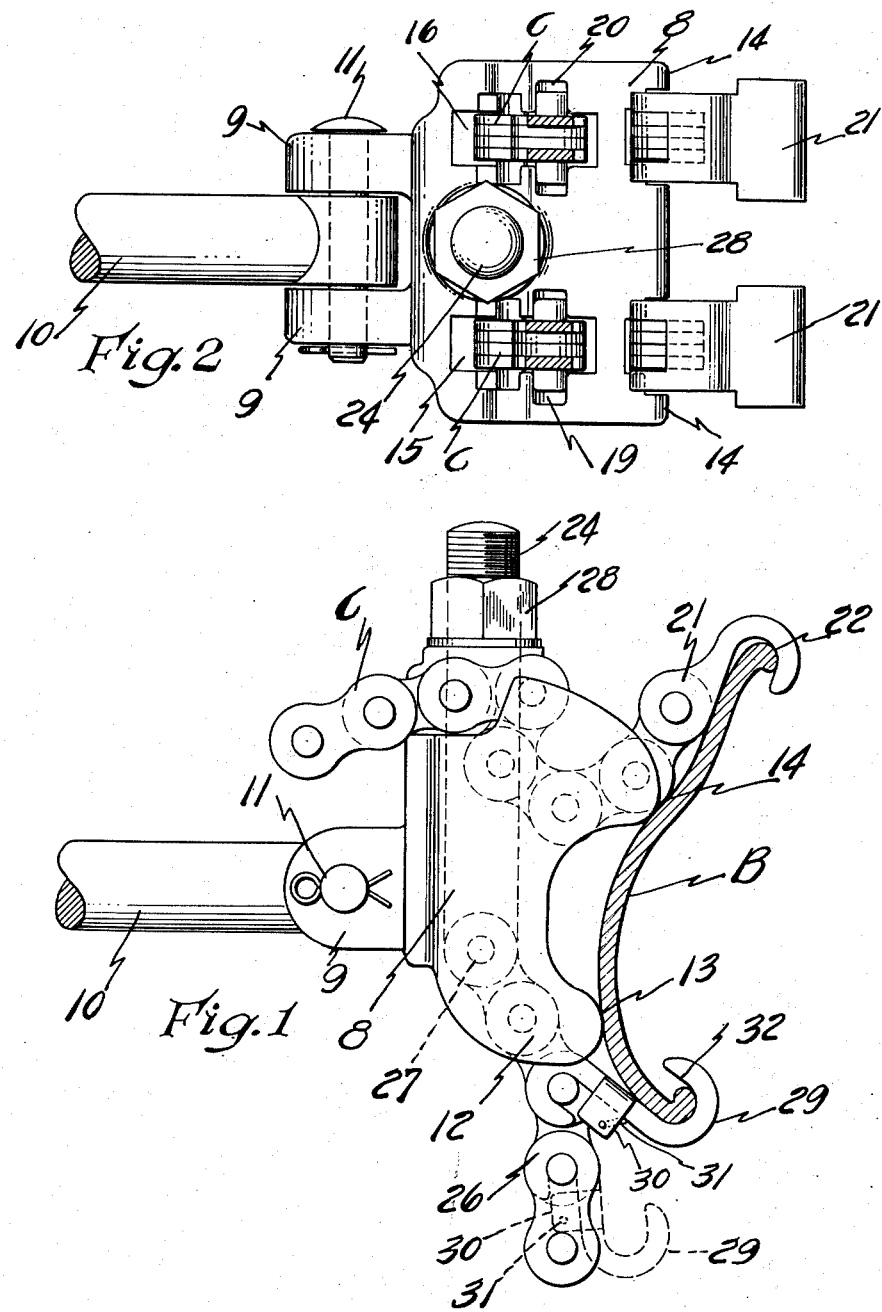

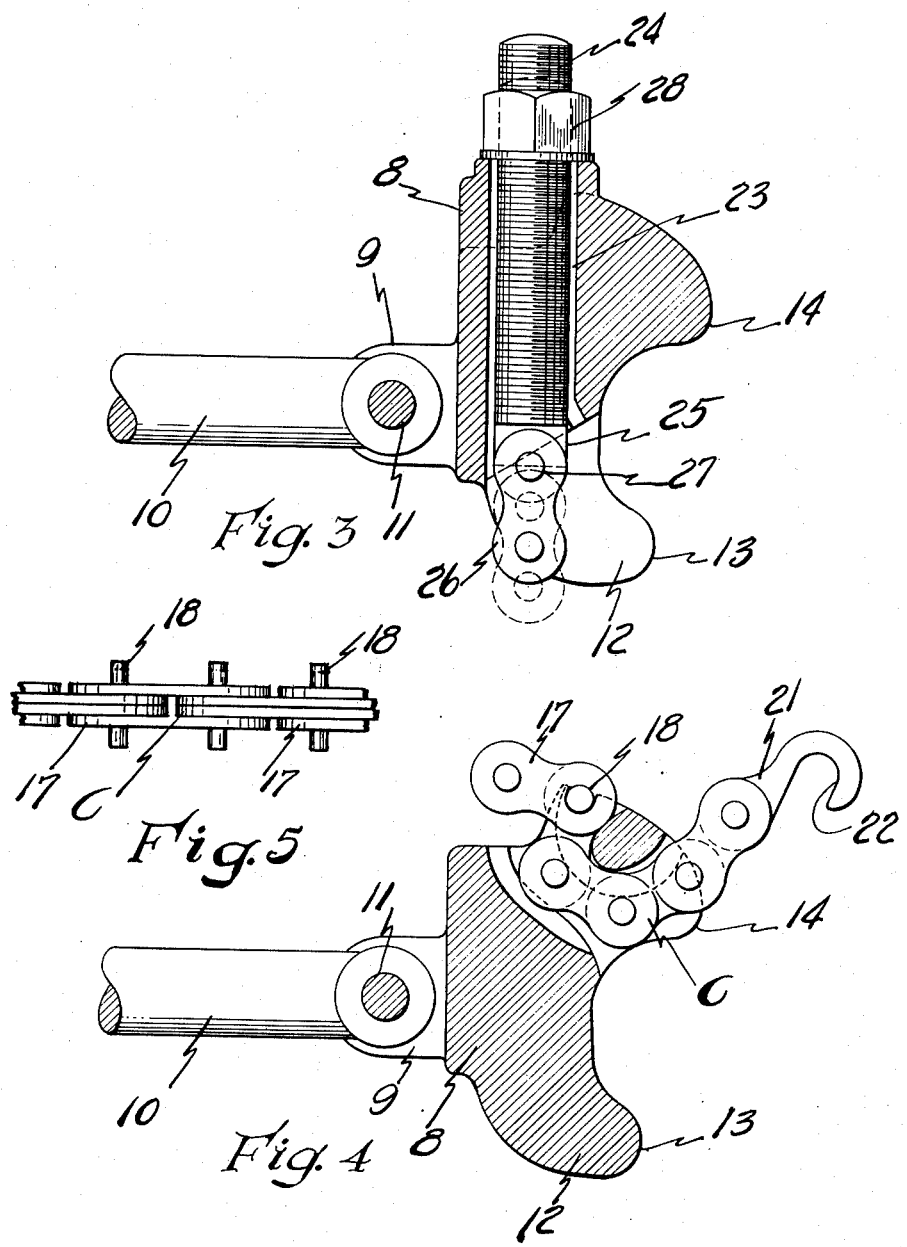

2,610,070

UNITED STATES PATENT OFFICE 2,610,070

TOW BAR

Cletus A. Klein, Caro, Mich.

Application August 14, 1948, Serial No. 44,335

7 Claims. (Cl. 280—33.44)

This invention relates to tow or draft bars such as used to couple a trailer or other vehicle to a bumper of an automobile.

One of the prime objects of the invention is to provide a draft bar so designed that it can be readily connected to and/or disconnected from an automobile bumper, without the use of special tools, and without boring holes in or otherwise defacing the bumper.

Another object of the invention is to design an attaching device, which is adjustable to fit bumpers of different vertical widths and shapes, and which permits of universal movement in any direction, to the end that the towed vehicle may turn and ride over rough terrain, without in any manner clamping or binding the securing means.

A further object is to provide a very simple, practical, and relatively inexpensive draft or tow bar which can be readily manufactured and assembled, which is exceedingly effective for the purpose for which it is designed, and which can be readily attached without the possibility of injury to the workman when attaching it in position.

With the above and other objects in view, the present invention consists in the combination and arrangement of parts, hereinafter more fully described, illustrated in the accompanying drawings, and more particularly pointed out in the appended claims, it being understood that changes may be made in the form, size, proportion, and minor details of construction, without departing from the spirit, or sacrificing any of the advantages of the invention.

In the drawings:

Fig. 1 is a side-elevational view showing my improved tow bar attached to an automobile bumper which is shown in section.

Fig. 2 is a top, plan view thereof with the bumper omitted.

Fig. 3 is a section taken on the line 3—3 of Fig. 2.

Fig. 4 is a section taken on the line 4—4 of Fig. 2.

Fig. 5 is a fragmentary, plan view of a section of the chain and attaching link.

Referring now more specifically to the drawings. The tow bar includes a preferably cast head element 8 formed as clearly shown in the drawings and having spaced-apart ears 9 cast integral with the rear face thereof, and to which one end of a draft bar 10 is connected by means of a pin 11.

The lower end of the head element is bifurcated to form legs 12, the projecting edges or cheeks 13 of which may bear against the bumper "B" when the tow bar is in attached position; similar forwardly projecting sections 14 are provided on the upper edge of the head element, and these sections also bear on the bumper when the tow bar is in attached position.

Laterally spaced, downwardly and outwardly curved passages 15 and 16 are formed in said head element as shown, and accommodate the flexible chains "C" which are connected to the head and bumper respectively, and in a manner to be hereinafter described.

Each chain is made up of a plurality of links 17 connected by means of pins 18 which project a predetermined distance beyond the side walls of the links, and pin pockets 19 and 20 are provided in the head element directly adjacent the passages 15 and 16 to accommodate the projecting ends of one of the pins 18 for anchoring said chain to the head, the outer free end of each chain being provided with a hook link 21 hingedly connected to the end pin 18 and being formed with an open jaw 22 for engagement with the upper edge of a bumper "B" and as clearly shown in Fig. 1 of the drawings.

Each of the chains is identical in construction and the anchoring and attachment is exactly the same, therefore, a description of but one will suffice for both.

The passages 15 and 16 are formed as clearly shown in Fig. 4 of the drawings to permit easy travel of the chains therein, and to accommodate the projecting ends of the pin without snagging etc.

A centrally disposed vertical opening 23 is provided in the block 8, and a bolt 24 is accommodated therein, the lower end of said bolt being flatted as at 25, and one end of a chain 26 is connected thereto by means of a pin 27, the upper end of the bolt being threaded and a nut 28 is provided thereon, said chain being exactly the same as that above described, excepting that the one end is anchored to the bolt 24 and the opposite end has an attaching link 29 secured to one of the link pins 18 at a point intermediate the length of the chain.

Wings 30 are provided on the edges of the link 29 and a yoke member 31 is pivotally mounted in said wings and bears on the face of the links to prevent accidental release thereof, and a hook-shaped jaw section 32 is formed integral with the link 29 for releasably engaging the lower edge of the bumper.

In practice, the device is attached by hooking the jaw-shaped ends 22 of the chains "C" over the upper ends of the bumper "B," after which the operator lifts the pins 18 out of the pin seats 19 and 20 and takes up the slack in the chains, then dropping the proper pin into the pin seat.

The next step is to connect the lower chain to the lower edge of the bumper. The operator first connects the attaching link 29 to the proper pin 18 at a point intermediate the length of the chain, hooks the jaw onto the lower edge of the bumper, and then manipulates the nut 28 to take up the remaining slack, so that the jaws 22 and 32 are firmly secured to the bumper, and the attachment is completed.

To release, it is merely necessary to reverse the operation, loosening the nut 28 to provide sufficient slack in the lower chain "C" to permit the link 29 to fall free, after which the links 21 are easily removable. The shape and design of the bumper is immaterial as the chains are flexible and can be attached to any design.

While in the present instance I have shown two chains for attachment to the bumper at the upper end of the device, it will be readily understood that this is a matter of choice only, and that but one chain can be provided at the top if desired; likewise, there can be two chains provided at the lower end of the coupling head if desired and found expedient.

While the specification sets forth in detail the present preferred construction of the device, still in practice such deviations from such details may be resorted to as do not form a departure from the spirit of the invention as defined by the claims.

What I claim is:

1. In a tow bar hitch, the combination of a coupling formed with spaced-apart passages in the upper end thereof, individual link chains having one end slidably and adjustably mounted in said passages and engageable with the upper edge of an automobile bumper, an adjustable member mounted in said head, a coupling chain connected to the lower end of the adjusting member and having an attaching link thereon and adapted to be connected to the lower edge of the bumper, said adjusting member subjecting the chains to clamping stresses.

2. In combination with a tow bar, of a coupling head element adapted to be secured to an automobile bumper, said element being formed with a passage in the upper end thereof, a link chain having its one end adjustably accommodated in said passage and formed with a hook on the opposite end for engagement with the upper edge of a bumper, said chain being provided with laterally projecting pins projecting beyond the side walls of the links, seats in the upper face of the head element for releasably accommodating a predetermined pair of pins therein and secure the chain in adjusted position, adjustable means mounted on said head element, a link chain connected on one end thereof, an attaching link on said chain for engagement with the lower edge of the bumper, and means for actuating the adjustable means to apply clamping stress to said chains and firmly secure the head element to said bumper.

3. In combination with a tow bar, of a coupling head element adapted to be secured to an automobile bumper, a draft bar hingedly secured to the one face of the head element, a chain passage in the upper end of the element, pin seats in the head element directly adjacent the chain passage, a link chain accommodated in said passage, laterally projecting means on said chain and releasably engageable in said seats for securing the chain in position, said chain having a hook on its free end for engagement with the upper edge of a bumper, a quickly adjustable member mounted in said head element, a chain connected to one end thereof and to the lower edge of the bumper, said element serving to tighten said chains and firmly secure said head element to said bumper.

4. In a tow bar hitch, the combination of a coupling formed with a passage in the upper end thereof, pin pockets adjacent said passage, a link chain slidably and adjustably mounted in said passage and releasably anchored in said pin pockets with its outer free end engageable with the upper edge of an automobile bumper, an adjustable member mounted in said head, a coupling chain attached to the lower end of the adjustable member and having an attaching link adapted to be connected to the lower edge of the bumper, said adjusting member subjecting said chain to clamping stresses.

5. The combination defined in claim 4 in which the link chain is provided with projecting hinge pins engageable in said pin pockets, and forwardly projecting cheeks on said coupling for engagement with the face of the bumper.

6. The combination as defined in claim 2 in which the link chain connected to the one end of the adjustable means is formed with laterally projecting pins projecting beyond the side wall of the links, and the attaching link on said chain for engaging the lower edge of the bumper is loosely mounted thereon.

7. The combination as defined in claim 2 in which the one end of the adjustable means is flatted and the link chain is pivotally connected thereto.

CLETUS A. KLEIN.

REFERENCES CITED

The following references are of record in the file of this patent:

UNITED STATES PATENTS

| Number | Name | Date |
|---|---|---|
| 2,338,934 | Gross | Jan. 11, 1944 |
| 2,446,218 | Dunlap | Aug. 3, 1948 |
| 2,468,438 | Galen | Apr. 26, 1949 |
| 2,488,415 | Klein | Nov. 15, 1949 |